US008607455B2

(12) United States Patent
Ahmad

(10) Patent No.: US 8,607,455 B2
(45) Date of Patent: Dec. 17, 2013

(54) METHOD FOR THE PRODUCTION OF COATED TURBINE MOVING BLADES AND MOVING-BLADE RING FOR A ROTOR OF AN AXIAL-THROUGHFLOW TURBINE

(75) Inventor: Fathi Ahmad, Kaarst (DE)

(73) Assignee: Siemens Aktiengesellschaft, München (DE)

( * ) Notice: Subject to any disclaimer, the term of this patent is extended or adjusted under 35 U.S.C. 154(b) by 1090 days.

(21) Appl. No.: 12/596,780

(22) PCT Filed: Apr. 10, 2008

(86) PCT No.: PCT/EP2008/054338
§ 371 (c)(1),
(2), (4) Date: Oct. 20, 2009

(87) PCT Pub. No.: WO2008/128902
PCT Pub. Date: Oct. 30, 2008

(65) Prior Publication Data

US 2010/0129554 A1 May 27, 2010

(51) Int. Cl.
*B21D 53/78* (2006.01)
*B21K 3/04* (2006.01)
*B23P 6/00* (2006.01)
*F01D 5/16* (2006.01)
*F01D 25/06* (2006.01)

(52) U.S. Cl.
USPC .................... 29/889.7; 29/889.71; 29/889.72; 29/889.1; 29/402.06; 416/500; 416/223 R

(58) Field of Classification Search
USPC .............................. 29/889.1, 889.7–889.722, 29/402.01–402.08, 402.18, 402.19; 416/500, 231 R, 223 R, 241 R
See application file for complete search history.

(56) References Cited

U.S. PATENT DOCUMENTS 4,097,192 A 6/1978 Kulina
5,156,529 A * 10/1992 Ferleger et al. ............... 416/190
6,042,338 A * 3/2000 Brafford et al. ............... 416/203
6,172,331 B1 * 1/2001 Chen ........................ 219/121.71
6,854,959 B2 * 2/2005 Barb ................................ 416/1
6,976,826 B2 * 12/2005 Roy et al. .......................... 416/1
7,008,179 B2 * 3/2006 Rinck et al. ................... 415/119
7,270,517 B2 * 9/2007 Garner .......................... 416/145
7,387,492 B2 * 6/2008 Pang et al. .................. 416/97 R
7,862,300 B2 * 1/2011 Nadvit et al. ............ 416/193 A
2002/0141872 A1 10/2002 Darolia et al.
2004/0151592 A1 8/2004 Schreiber
2006/0073022 A1 * 4/2006 Gentile et al. ............ 416/223 R

FOREIGN PATENT DOCUMENTS

| | | | |
|---|---|---|---|
| EP | 1 640 562 | A1 | 3/2006 |
| EP | 1 752 610 | A2 | 2/2007 |
| JP | 2000130102 | A | 5/2000 |
| RU | 2078945 | C1 | 5/1997 |
| WO | WO 03/062606 | A1 | 7/2003 |
| WO | 2005044508 | A1 | 5/2005 |

OTHER PUBLICATIONS

Ishlinsky, "Polytechnic Dictonary", Second Edition, Soviet Encyclopedia, Moscow, 1980, p. 464.

* cited by examiner

*Primary Examiner* — Sarang Afzali

(57) ABSTRACT

A method for producing a coated turbine blade, with which the frequency property thereof can be particularly easily adjusted to the required boundary conditions is provided. Recesses are introduced into a blade tip of the blade leaf of the turbine blade after coating of turbine blade. In one aspect a plurality of bores are made which are distributed along the blade leaf center line.

14 Claims, 2 Drawing Sheets

METHOD FOR THE PRODUCTION OF COATED TURBINE MOVING BLADES AND MOVING-BLADE RING FOR A ROTOR OF AN AXIAL-THROUGHFLOW TURBINE

CROSS REFERENCE TO RELATED APPLICATIONS

This application is the US National Stage of International Application No. PCT/EP2008/054338, filed Apr. 10, 2008 and claims the benefit thereof. The International Application claims the benefits of European Patent Office application No. 07008237.5 EP filed Apr. 23, 2007, both of the applications are incorporated by reference herein in their entirety.

FIELD OF INVENTION

The invention relates to a method for the production of a coated turbine moving blade, in which a turbine moving blade is coated with at least one protective layer, and in which, in order to set the characteristic frequency of the turbine moving blade, at least one recess is introduced into a blade tip of a blade leaf of the turbine moving blade.

BACKGROUND OF INVENTION

It is known to provide turbine moving blades with a protective layer so that they have a prolonged service life when they are in operation in a gas turbine. In this context, the protective layer applied to the turbine moving blade manufactured by casting is often a corrosion protection layer of the type MCrAlY. The protective layer is in this case applied in that region of the blade surface which is exposed to the hot gas when the gas turbine is in operation. This region comprises both the blade leaf and the platform of the turbine moving blade, the blade leaf being integrally formed on said platform. Moreover, in addition to the corrosion protection layer, a heat insulation layer may be applied in the abovementioned region, in order to keep the introduction of heat from the hot gas into the basic material of the turbine moving blade as low as possible.

It is known, furthermore, that turbine moving blades are exposed to the excitation of oscillations when the gas turbine is in operation. Excitation to oscillation occurs because of the rotation of the rotor to which the turbine moving blades are fastened. A further contribution to the excitation of oscillations in the blade leaves of the turbine moving blades is made by the hot gas which impinges onto them. Since the blade leaves of the turbine moving blades rotate downstream of a rim of turbine guide blades, as seen in the direction of flow of the hot gas, these are excited to oscillate by cyclically impinging hot gas. It is therefore necessary that each turbine moving blade has a sufficiently high characteristic frequency to ensure that neither the excitation to oscillation emanating from the rotor rotational speed nor that emanating from the hot gas, with respective exciting frequencies, leads to an inadmissibly high oscillation of the blade leaf. Accordingly, in the prior art, the turbine moving blades are designed in such a way that their characteristic frequency deviates from the exciting frequencies of the stationary gas turbine. Care is therefore taken, in the development of the turbine moving blade, to ensure that the finished turbine moving blade, overall, satisfies the requirements with regard to natural resonance.

In the process for manufacturing the turbine moving blade, therefore, there is provision for checking the oscillation properties of each individual turbine moving blade. Insofar as the turbine moving blade does not fulfill the stipulated frequency values in terms of characteristic frequency, it has to be rejected or manipulated by means of suitable measures in such a way that it is then suitable for operation and fulfills the requirements as to characteristic frequency. So that turbine moving blades which are not intended for use in the gas turbine solely because of their oscillation property can still be employed, it is known from U.S. Pat. No. 4,097,192 to introduce a recess on the end face of the blade leaf of the turbine moving blade, with the result that the mass of the turbine moving blade at its free oscillatory end can be reduced. By the mass of the turbine moving blade being reduced, the oscillation property is influenced positively. Its characteristic frequency can be shifted toward higher characteristic frequencies by the removal of the mass, in particular at its outer end.

Moreover, WO2003/06260A1 discloses a method for changing the frequency of moving blades which are already ready for use. According to this, to change the frequency, a metallic covering is applied to the blade leaf in the region of the blade leaf tip, the thickness of which covering tapers continuously at the outlet edge and in the radial direction toward the blade foot. The disadvantage of this, however, is that the aerodynamics of the moving blade are consequently also modified.

Moreover, it is known that measures for prolonging the service life are carried out on turbine moving blades previously used in gas turbines. These measures comprise, on the one hand, the elimination of cracks which have occurred during operation and, on the other hand, the renewal of the protective layers provided on the turbine moving blades.

SUMMARY OF INVENTION

The object of the invention is to provide a method for the production of coated turbine moving blades, the characteristic frequency of which conforms to the requirements for use within a stationary gas turbine.

The object related to the method is achieved by means of a method according to the features of the claims, advantageous refinements being reflected in the subclaims.

The invention proceeds from the recognition that the introduction of the recesses for setting the characteristic frequency should take place after the coating of the turbine moving blade. Only after the turbine moving blade has been coated has it reached its ultimate configuration and its ultimate weight, the characteristic frequency (=resonant frequency) of the turbine moving blade also depending on this. Particularly the application of a corrosion layer to a turbine moving blade leads to a significant increase in mass, with the result that the characteristic frequency of the respective turbine moving blade decreases. There is therefore the risk that the characteristic frequency of the turbine moving blade approaches one of the exciting frequencies, so that a harmful or service life-curtailing excitation to oscillation of the turbine moving blade or of the blade leaf is more likely when the gas turbine is in operation. Turbine moving blades which, while the gas turbine is in operation, continually experience an excitation to oscillation and continually oscillate have an increased risk of fracture and a shortened service life. The load which the turbine moving blade experiences as a result of the excitation to oscillation is also designated as HCF load (high cycle fatigue).

The invention proposes, in particular, to adapt a used turbine moving blade, which has already spent part of its service life and is to acquire a prolongation of its service life by means of what is known as refurbishment (upgrading), for operation in the stationary gas turbine. Since refurbishment often involves the removal of the coating of a turbine moving blade and recoating in the abovementioned regions, the upgraded turbine moving blade, after being coated, has to undergo a check of the characteristic frequency, and, where appropriate, this can be improved by the removal of mass in the region of the blade tip of the blade leaf. By mass being removed at the free end of the turbine moving blade, the characteristic frequency is shifted away from the exciting frequencies.

Often, in the treatment of the turbine moving blade, what is known as an upgrade (modernization) of the gas turbine is also carried out, which is intended to lead to a higher power output and to an improved efficiency of the gas turbine by an increase in the permissible hot gas temperature. The result of the higher permissible hot gas temperature is that both the corrosion protection layer and the heat insulation layer have to be applied with a greater layer thickness than originally planned to the turbine blade which has had its coating removed, so that this can also withstand the high temperatures. The greater layer thickness leads to a increase in mass. In order to compensate the increase in mass and to achieve the original oscillation properties of the turbine moving blade again, a hole is drilled into the end face of the blade tip of the blade leaf in the direction of the blade foot of the turbine blade, with the result that the oscillation-relevant mass can be extracted at the free end of the turbine moving blade. In this case, a plurality of bores are made which are distributed along the blade leaf center line. The blade leaf center line in this case must not run through the bores.

The bores may also be arranged along the blade leaf center line laterally with respect to said line. Overall, by virtue of this arrangement, the intactness and strength of the turbine moving blade remain unimpaired. There is in this case provision, when a given mass is to be removed by means of bores in the blade leaf, for providing a larger number of bores with a small drilling depth than a small number of bores with a greater drilling depth.

The turbine moving blades, when installed in the rotor of a turbine, then result in a ring according to the invention consisting of turbine moving blades for the rotor of a turbine, which ring is then particularly unsusceptible to the excitation to oscillation of the blade leaves which emanates from hot gas. Preferably, in this case, all the turbine moving blades of the ring have been produced by means of the method according to the invention.

The bores may amount to a drilling depth of up to 50% of the radial extent of the blade leaf with respect to the installation position of the turbine moving blade in a stationary gas turbine. This is possible because comparatively low mechanical loads occur in the blade leaf in this region and a weakening of the material cross section is permissible in spite of the high centrifugal forces.

Preferably, the method may also be applied to a turbine moving blade which has an internally coolable blade leaf. In this instance, the bores must be provided at the locations of the blade leaf at which supporting ribs, as they are known, issue into the suction-side blade leaf wall and the delivery-side blade leaf wall between these. Alternatively or additionally, bores may also be introduced in that portion of the trailing edge in which the suction side wall and the delivery side wall converge. In order to avoid corrosion of the turbine moving blade inside the bores or recesses, there may be provision whereby, after the introduction of the bores, their orifices are closed superficially by means of a plug or a solder. However, the bores are in this case not filled up, so that a cavity remains.

BRIEF DESCRIPTION OF THE DRAWINGS

The invention is explained by means of a drawing, identical reference symbols designating identically acting components.

In the drawing.

DETAILED DESCRIPTION OF INVENTION

Figure 1:
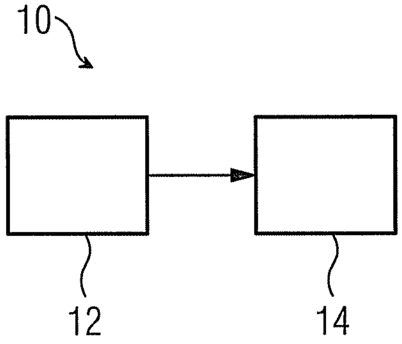
FIG. 1 shows the method according to the invention for the production of coated turbine moving blades.

The method 10 according to the invention is illustrated in FIG. 1. The method 10 for the production of coated turbine blades comprises, in a first step 12, the coating of the turbine moving blade with a protective layer. The protective layer is in this case preferably a corrosion protection layer of the type MCrAlY. Alternatively, a two-ply protective layer may also be provided, which comprises as a bond coat a layer of the type MCrAlY, on which a ceramic heat insulation layer (thermal barrier coat—TBC) has also been applied further toward outside. Since the turbine moving blade, as a rule, is cast and correspondingly comprises a cast basic body, its mass is further increased as a result of the application of the protective layer, in particular a corrosion protection layer. The variation in the characteristic frequency of the turbine moving blade which accompanies the increase in mass can be compensated by the introduction of recesses at the blade tip of the blade leaf of the turbine moving blade in a second method step 14. There is in this case provision for introducing recesses of such a number and of such a depth into the end face of the blade leaf of the turbine moving blade until the turbine moving blade satisfies the requirements as to characteristic frequency. It may in this case be that, despite the use of the method according to the invention, the characteristic frequency cannot be influenced to an extent such that it satisfies the requirements. In this situation, the turbine moving blade is not suitable for further use.

Figure 2:
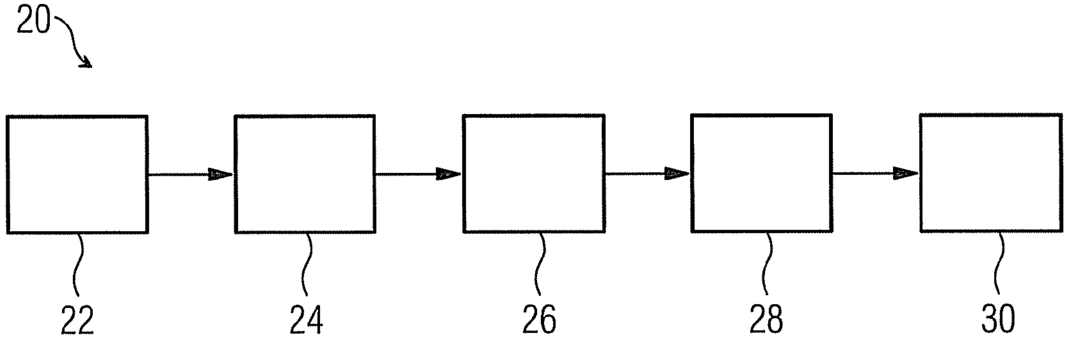
FIG. 2 shows the sequence and method for the refurbishment of used turbine moving blades.

FIG. 2 illustrates a method 20 in which used turbine moving blades, that is to say turbine moving blades already employed in the operation of a stationary gas turbine, are partly renovated by means of an upgrading process, what is known as refurbishment. Refurbishment serves as a measure prolonging the service life of the turbine moving blade. Accordingly, in a first method step 22, turbine moving blades are exposed to a hot gas of the gas turbine when the latter is in operation. During an inspection or check of the gas turbine, the turbine moving blades are demounted and, insofar as they are recyclable, are delivered to the refurbishment process. The refurbishment process in this case comprises a step 24 in which, where appropriate, the coating is removed from coated turbine moving blades. Coating removal is necessary when, for example, medium-sized or larger cracks are present in the protective layer or partial flaking or abrasion cause the actual layer thickness to shrink below a required minimum amount. In a subsequent optional step 26, where appropriate, cracks which have occurred in the basic material of the turbine moving blade have to be eliminated by means of known repair methods. In a further step 28, the recoating of the turbine moving blade with a single-ply or two-ply protective layer then takes place, after which, in a last step 30, the drilling of holes into the end face of the blade tip in the direction of a blade foot of the turbine moving blade can finally be drilled in order to set the characteristic frequency.

Figure 3:
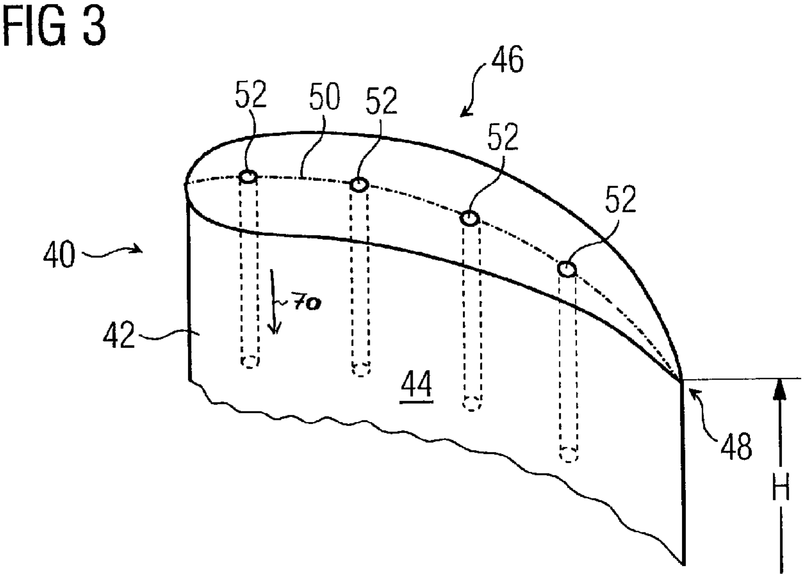
FIG. 3 shows a perspective view of the blade leaf of a turbine moving blade with bores arranged on the blade tip side.

FIG. 3 shows a turbine moving blade 40 partly in a perspective illustration. The turbine moving blade 40 comprises, as is known, a blade foot, not illustrated, of pinetree-shaped cross section which a blade platform, not illustrated, adjoins. Arranged on the blade platform is a free-standing blade leaf 42 which is curved aerodynamically with a drop-shaped cross section. The blade leaf 42 comprises a delivery side 44 and suction side 46. FIG. 3 illustrates only the blade leaf tip 48 which lies opposite that end of the blade leaf 42 which is fastened to the platform. Between the blade leaf tip 48 and the platform, the blade leaf 42 has a height H which can be detected in the radial direction in respect of its installation position in an axial-throughflow stationary gas turbine. The aerodynamically curved blade leaf 42 comprises a blade center line 50 which runs centrally between the suction side 46 and the delivery side 44 from a leading edge to a trailing edge. The blade leaf center line 50 is illustrated by a dashed and dotted line. For example, four recesses in the form of bores 52 are provided, distributed along the blade leaf center line 50, and extend from the end face of the blade leaf 42 in the direction 70 of the blade foot of the turbine moving blade 40. The weight has been reduced at the free end of the turbine moving blade 40 by means of the bores 52, with the result that the characteristic frequency has been shifted toward higher frequencies.

By means of the bores arranged on the end face, an approximately 10% frequency shift of the characteristic frequency can take place. The blade leaf 42 illustrated in FIG. 3 is in this case uncooled.

Figure 4:
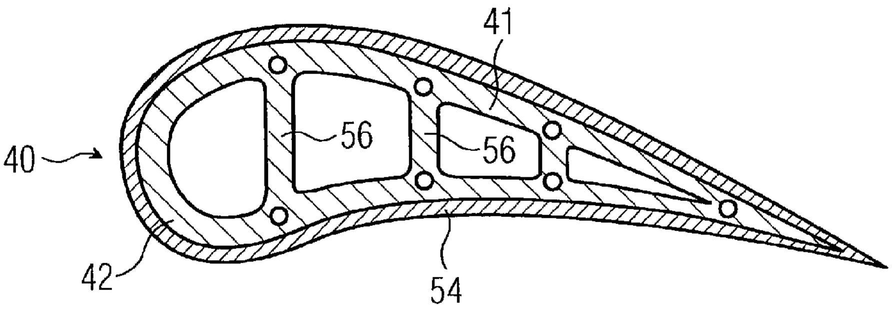
FIG. 4 shows the cross section through an internally cooled turbine moving blade according to the invention.

FIG. 4 shows the cross section through the blade leaf 42 of a turbine moving blade 40 produced by the method according to the invention.

The section has in this case been drawn into the region of the blade leaf tip 48. The turbine blade 40 according to FIG. 4 comprises the cast basic body 41, onto which a protective layer 54 has been applied both on the suction side and on the delivery side. The protective layer 54 has significantly increased the mass of the turbine moving blade 40, thus resulting in a change in the characteristic frequency toward lower frequencies. In order to compensate this shift of the characteristic frequency, bores 52 are introduced from the end face of the blade leaf 42. The bores 52 are provided in the blade leaf 42 at the locations where the supporting ribs 56 present inside are connected to the delivery-side or suction-side blade wall 44, 46. There may also be provision for making the bores 52 in the region of the trailing edge of the turbine moving blade 40, at which the suction-side pressure wall 46 is combined with the delivery-side blade wall 44, said bores in this case preferably being distributed there in this portion of the blade leaf center line.

Overall, therefore, the invention proposes a method for the production of coated turbine moving blades 40, the frequency property of which can be adapted particularly simply to the required boundary conditions. For this purpose, there is provision for the introduction of recesses into a blade tip 48 of the blade leaf 42 of the turbine blade 40 to take place after the coating of the turbine moving blade 40. This affords a method whereby the oscillation property of the turbine blade can be set particularly simply and variably. The reject rate of turbine moving blades 40 can thus be reduced. It is likewise possible for a turbine blade which has otherwise become useless because of design changes to be adapted in such a way that it satisfies at least the requirements with regards characteristic frequency again. Also, by means of the method according to the invention, already used turbine blades can be treated in a refurbishment process so that they can be reused.

The invention claimed is:

1. A method for the production of a coated turbine moving blade, comprising:

coating a turbine moving blade with a protective layer; and introducing a plurality of recesses into a blade tip of a blade leaf of the turbine moving blade, wherein the number and depth of the recesses are configured to compensate a shift in characteristic frequency of the turbine moving blade produced by a mass of the protective layer, wherein the introduction of the plurality of recesses occurs after the coating of the turbine moving blade, wherein each of the plurality of recesses is a hole which is drilled into the blade tip in a direction of a blade foot of the turbine moving blade, and wherein the plurality of recesses are distributed along a center line of the blade leaf, the center line running centrally from a leading edge to a trailing edge of the blade leaf.

2. The method as claimed in claim 1, further comprising superficially closing the drilled recesses.

3. The method as claimed in claim 2, wherein the plurality of recesses are closed using a plug or solder, whereby each recess is partially filled up leaving a cavity.

4. The method as claimed in claim 1, wherein a drill depth is to 50% of a radial extent of the blade leaf with respect to an installation position of the turbine moving blade.

5. The method as claimed in claim 1, wherein prior to the step of coating, an existing coating is removed from the turbine moving blade.

6. The method as claimed in claim 1, wherein the protective layer comprises a corrosion protection layer and/or a heat insulation layer.

7. A method for the production of a coated turbine moving blade, comprising:

coating a turbine moving blade with a protective layer; and introducing a plurality of recesses into a blade tip of a blade leaf of the turbine moving blade, wherein the number and depth of the recesses are configured to compensate a shift in characteristic frequency of the turbine moving blade produced by a mass of the protective layer, wherein the introduction of the plurality of recesses occurs after the coating of the turbine moving blade, wherein each of the plurality of recesses is a hole which is drilled into the blade tip in a direction of a blade foot of the turbine moving blade, and wherein the plurality of recesses are distributed laterally with respect to a center line of the blade leaf, the center line running centrally from a leading edge to a trailing edge of the blade leaf.

8. The method as claimed in claim 7, further comprising superficially closing the drilled recesses.

9. The method as claimed in claim 8, wherein the plurality of recesses are closed using a plug or solder, whereby each recess is partially filled up leaving a cavity.

10. The method as claimed in claim 7, wherein the method is performed on a turbine moving blade having an internally coolable blade leaf.

11. The method as claimed in claim 7, wherein the plurality of recesses are made in a region of a trailing edge of the turbine moving blade where a suction-side pressure wall meets a delivery-side pressure wall.

12. The method as claimed in claim 7, wherein a drill depth is to 50% of a radial extent of the blade leaf with respect to an installation position of the turbine moving blade.

13. The method as claimed in claim 7, wherein prior to the step of coating, an existing coating is removed from the turbine moving blade.

14. The method as claimed in claim 7, wherein the protective layer comprises a corrosion protection layer and/or a heat insulation layer.

* * * * *